United States Patent
Borchert et al.

(10) Patent No.: US 10,370,143 B2
(45) Date of Patent: Aug. 6, 2019

(54) CONTAINER OF THERMOPLASTIC MATERIAL

(71) Applicant: Kautex Textron GmbH & Co. KG, Bonn (DE)

(72) Inventors: Matthias Borchert, Bonn (DE); Timo Kramer, Hirz-Maulsbach (DE); Klaus Gebert, Willich (DE); Dirk Eulitz, Bonn (DE); Gerd Wolter, Konigswinter (DE); Harald Lorenz, Bad Neuenahr-Ahrweiler (DE); Deniz Bienhuls, Windhagen (DE); Christoph Mehren, Konigswinter (DE); Robert Lower, Rheinbach (DE)

(73) Assignee: KAUTEX TEXTRON GMBH & CO. KG, Bonn (DE)

(*) Notice: Subject to any disclaimer, the term of this patent is extended or adjusted under 35 U.S.C. 154(b) by 0 days.

(21) Appl. No.: 14/703,383

(22) Filed: May 4, 2015

(65) Prior Publication Data

US 2015/0232227 A1    Aug. 20, 2015

Related U.S. Application Data

(62) Division of application No. 11/772,932, filed on Jul. 3, 2007, now Pat. No. 9,023,264.

(Continued)

(51) Int. Cl.
*B65D 88/00* (2006.01)
*B65D 6/34* (2006.01)

(Continued)

(52) U.S. Cl.
CPC ............. *B65D 11/22* (2013.01); *B29C 49/20* (2013.01); *B29C 51/267* (2013.01);

(Continued)

(58) Field of Classification Search
None
See application file for complete search history.

(56) References Cited

U.S. PATENT DOCUMENTS 2,300,594 A    11/1942  Rehfeld
2,366,274 A *  1/1945  Luth .................... B29C 65/605
                                                      156/293

(Continued)

FOREIGN PATENT DOCUMENTS

CA        993165       7/1976
DE      19600872       7/1997

(Continued)

OTHER PUBLICATIONS

PCT International Search Report dated Feb. 10, 2006 received in corresponding PCT Application No. PCT/EP06/12152, 5 pgs.

*Primary Examiner* — Edmund H Lee
(74) *Attorney, Agent, or Firm* — Grossman, Tucker, Perreault & Pfleger, PLLC

(57) ABSTRACT

An article enclosing at least one built-in fitment component in the form of a hollow body of thermoplastic material. The hollow body is preferably in the form of a fuel tank. The built-in fitment component is pressed against the inside wall of the article while still plastic so that the plastic material of the hollow body penetrates through at least one recess or opening of the built-in fitment component and flows therebehind.

36 Claims, 7 Drawing Sheets

Related U.S. Application Data

(60) Provisional application No. 60/806,487, filed on Jul. 3, 2006.

(51) Int. Cl.

| | | |
|---|---|---|
| *B29C 49/20* | (2006.01) | |
| *B29C 51/26* | (2006.01) | |
| *B29C 65/02* | (2006.01) | |
| *B29C 65/60* | (2006.01) | |
| *B29C 65/00* | (2006.01) | |
| *B60K 15/03* | (2006.01) | |
| *B65D 8/00* | (2006.01) | |
| *B29C 49/00* | (2006.01) | |
| *B29C 51/12* | (2006.01) | |
| *B29C 65/78* | (2006.01) | |
| *B29K 101/12* | (2006.01) | |
| *B29L 22/00* | (2006.01) | |
| *B29L 31/00* | (2006.01) | |
| *B60K 15/077* | (2006.01) | |

(52) U.S. Cl.
CPC .......... *B29C 65/028* (2013.01); *B29C 65/609* (2013.01); *B29C 66/131* (2013.01); *B29C 66/1312* (2013.01); *B29C 66/21* (2013.01); *B29C 66/532* (2013.01); *B29C 66/54* (2013.01); *B29C 66/61* (2013.01); *B29C 66/83221* (2013.01); *B60K 15/03177* (2013.01); *B65D 11/02* (2013.01); *B29C 49/0047* (2013.01); *B29C 51/12* (2013.01); *B29C 65/605* (2013.01); *B29C 65/7838* (2013.01); *B29C 2049/0057* (2013.01); *B29C 2791/001* (2013.01); *B29K 2101/12* (2013.01); *B29L 2022/00* (2013.01); *B29L 2031/7172* (2013.01); *B29L 2031/737* (2013.01); *B60K 2015/03032* (2013.01); *B60K 2015/03453* (2013.01); *B60K 2015/0777* (2013.01)

(56) References Cited

U.S. PATENT DOCUMENTS

| | | | |
|---|---|---|---|
| 3,458,618 A | | 7/1969 | Burns et al. |
| 4,911,878 A | | 3/1990 | Hopperdietzel |
| 4,952,347 A | | 8/1990 | Kasugai |
| 5,062,661 A | * | 11/1991 | Winget ............. B60Q 5/003 280/728.3 |
| 5,308,427 A | | 5/1994 | Duhaime et al. |
| 5,445,783 A | * | 8/1995 | Irish ............. B29C 49/20 264/515 |
| 5,487,557 A | * | 1/1996 | Eckhout ............. B29C 65/342 280/728.3 |
| 5,514,323 A | | 5/1996 | Ramioulle |
| 5,529,336 A | * | 6/1996 | Eckhout ............. B29C 65/342 280/728.3 |
| 5,725,241 A | * | 3/1998 | Schenck ............. B60Q 1/0082 280/728.3 |
| 6,053,526 A | * | 4/2000 | Preisler ............. B60R 13/005 280/728.2 |
| 6,138,859 A | * | 10/2000 | Aulph ............. B60K 15/03 137/574 |
| 6,338,420 B1 | * | 1/2002 | Pachciarz ......... B60K 15/03177 220/4.13 |
| 6,485,050 B1 | * | 11/2002 | Simon ............. B60Q 5/003 280/728.3 |
| 6,814,921 B1 | | 11/2004 | Van Schaftingen et al. |
| 6,834,913 B2 | | 12/2004 | Reed et al. |
| 6,840,755 B1 | | 1/2005 | Cook |
| 7,455,190 B2 | * | 11/2008 | Potter ............. B60K 15/03177 220/4.12 |
| 7,861,885 B2 | * | 1/2011 | Borchert ............. B29C 49/20 220/4.13 |
| 8,608,012 B2 | * | 12/2013 | Aoki ............. B29C 49/20 220/562 |
| 8,668,176 B2 | * | 3/2014 | Araya ............. B29C 66/30325 248/225.21 |
| 2002/0094414 A1 | | 7/2002 | Wagenblast et al. |
| 2002/0189797 A1 | | 12/2002 | Moitzheim |
| 2004/0090088 A1 | | 5/2004 | Reed et al. |
| 2006/0022381 A1 | | 2/2006 | Brozenick et al. |
| 2006/0102634 A1 | * | 5/2006 | Potter ............. B60K 15/03177 220/562 |
| 2008/0149642 A1 | * | 6/2008 | Borchert ............. B29C 49/20 220/562 |
| 2009/0139994 A1 | * | 6/2009 | Aoki ............. B29C 49/20 220/652 |
| 2014/0158696 A1 | * | 6/2014 | Criel ............. B60K 15/03177 220/562 |

FOREIGN PATENT DOCUMENTS

| | | |
|---|---|---|
| DE | 19730800 | 1/1999 |
| DE | 10132602 | 11/2002 |
| EP | 0103832 | 3/1984 |
| EP | 1329302 A1 | 7/2003 |
| EP | 1307332 | 4/2005 |
| GB | 1293431 | 10/1972 |
| GB | 2051661 | 1/1981 |
| JP | S61114835 | 6/1986 |
| JP | H01-101830 | 7/1989 |
| JP | H05-318565 | 12/1993 |
| JP | H10-290088 | 10/1998 |
| JP | 2002-202791 | 7/2002 |
| JP | 2002-283463 | 10/2002 |
| JP | 2002-285928 | 10/2002 |
| JP | 2003-039540 | 2/2003 |
| JP | 2004-505812 | 2/2004 |
| SU | 377977 | 4/1973 |

* cited by examiner

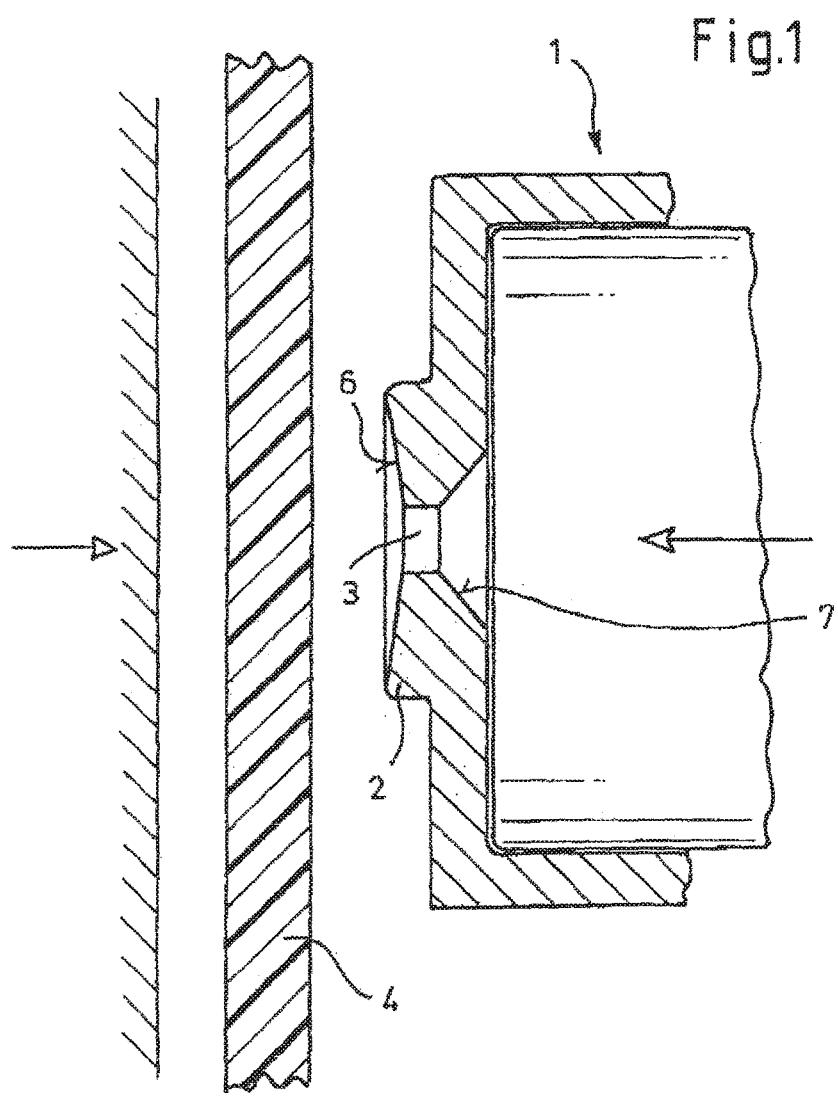

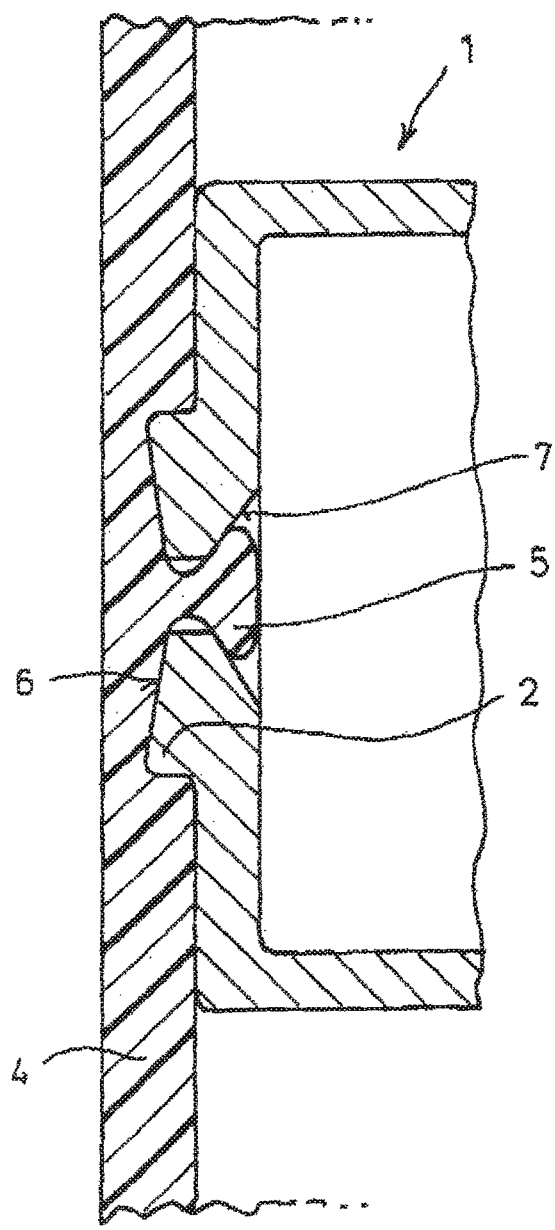

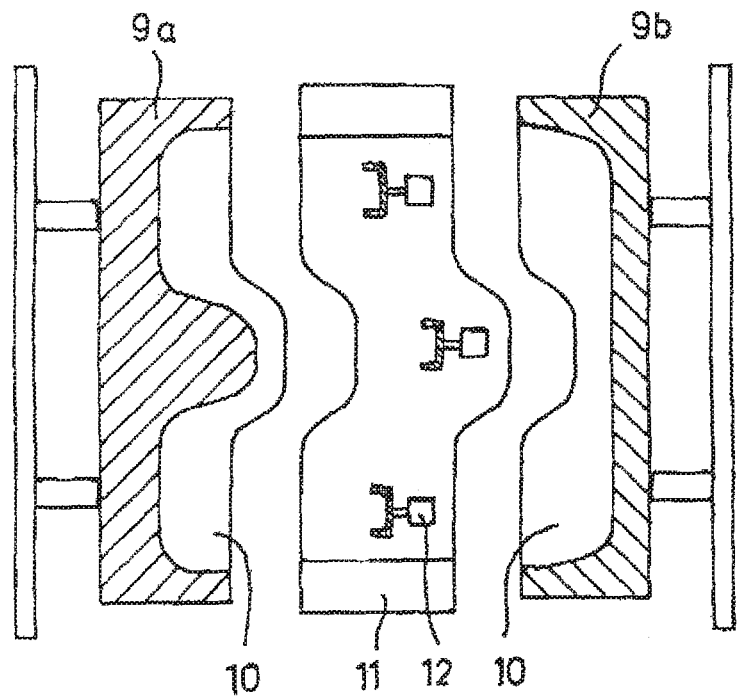
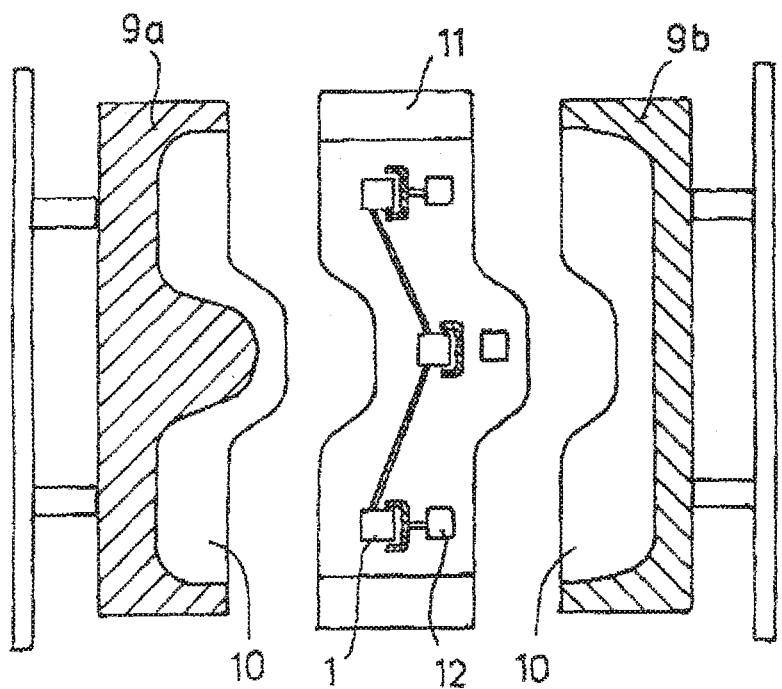

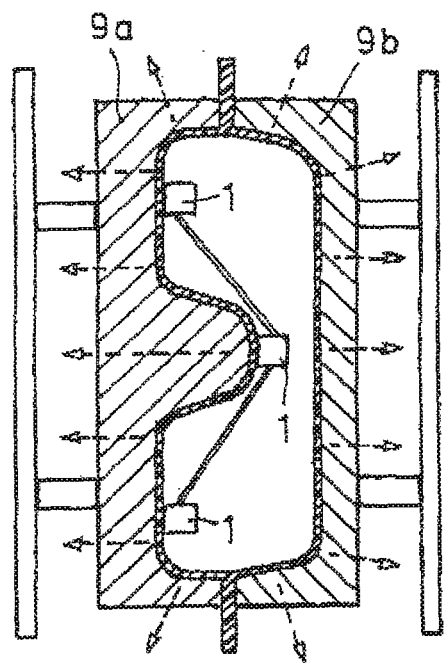
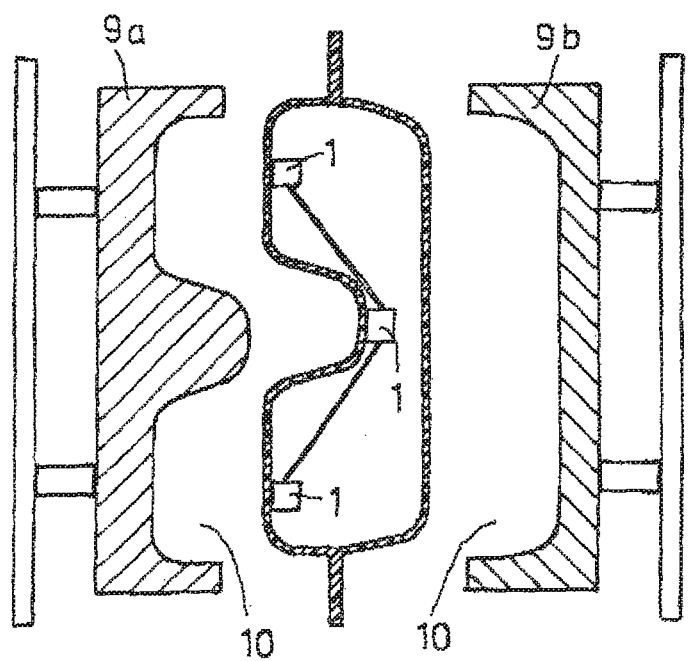

CONTAINER OF THERMOPLASTIC MATERIAL

CROSS-REFERENCE TO RELATED APPLICATIONS

This application is a divisional application of U.S. application Ser. No. 11/772,932, filed Jul. 3, 2007, now U.S. Pat. No. 9,023,264, which claims the benefit of U.S. provisional application No. 60/806,487 filed Jul. 3, 2006.

FIELD

The invention concerns a process for the production of a plastic hollow body and a plastic container.

BACKGROUND

A very wide range of different production processes are known for the production of hollow bodies of thermoplastic material, for example extrusion blow molding, deep drawing or injection molding. In the extrusion blow molding process the hollow body can be seamlessly produced for example from a single tubular preform. It will be noted that there is also the possibility of dividing up a tubular preform in respect of length into webs, placing the webs separately in a two-part or multi-part tool and expanding or shaping the webs within the tool by means of a reduced pressure or by the action of gas pressure.

Particularly in the production of technical components such as fuel tanks which are produced in the above-described manner in one or more parts from thermoplastic material, it is necessary for various built-in fitment components or attachments to be fixed to the hollow body. That can be effected in the first heat in the production procedure or also subsequently. If the hollow body is intended to accommodate the built-in fitment components in its interior, it is frequently necessary, because of the size of those components, for them to be introduced into the hollow body in the production of the latter. The built-in fitment components and attachments which are to be installed or attached can be clipped or welded to the hollow body, in which case the welding operation can be effected in production of the hollow body in the first heat or subsequently in the second heat, for example by friction welding or welding with a heat reflector.

Limits are often imposed on positively locking anchorage of a built-in fitment component in the interior of the hollow body, by virtue of the process for the production thereof. For example, when producing hollow bodies by an extrusion blow molding process, it is only limitedly possible to provide in the contour of the hollow body undercut configurations which permit built-in fitment components to be locked to the wall of the hollow body in positively engaging relationship. For that reason recourse is frequently had to welding as the joining procedure.

However welding the components together suffers from the disadvantage that the plastic materials to be joined must form a mutually weldable material pairing. That limits the choice of the built-in fitment components or attachments for the hollow body.

By way of example in the production of fuel tanks of plastic material that can represent a far-reaching limitation as certain plastic materials, in the presence of fuel, are sources or are permeable for hydrocarbons. Therefore for certain conduits and valves it is necessary to choose a material which from the outset excludes the possibility of welding to the tank or the hollow body.

Therefore the object of the invention is to provide a process for the production of an article enclosing built-in fitment components in the form of a hollow body of thermoplastic material, which permits particularly simple and secure fixing of built-in fitment components in the hollow body in the course of the production thereof.

A further object of the invention is to provide a plastic hollow body to which built-in fitment components or attachments are joined in positively locking relationship in a particularly simple fashion.

SUMMARY

The object is firstly attained by a process for the production of an article enclosing built-in fitment components in the form of a hollow body of thermoplastic material, in which one or more preforms in web or tube form of plasticized material are placed between the opened portions of a mold tool forming a cavity, at least one built-in fitment component to be enclosed by the finished article is placed between the portions of the mold tool and the tool is closed around the preforms and the built-in fitment component and the preforms within the cavity enclosed by the tool acquire the external configuration of the article, wherein the built-in fitment component is pressed during or directly after the shaping operation against the inside wall of the article while still plastic so that the plastic material of the hollow body penetrates through at least one recess or opening of the built-in fitment component and flows therebehind.

In that way it is possible to provide for positively locking anchorage of the built-in fitment component to the wall of the hollow body with comparatively simple means. The inside wall of the hollow body passes through and flows behind an anchorage opening in the built-in fitment component so that, after the components have cooled, the result obtained is a positively locking non-detachable join. There is no need for compatibility of the materials in the sense of weldability of the parts. The built-in fitment component can also comprise for example metal or another material.

Due to the configuration of the opening of the fitment component, the material of the wall of the hollow body, which flows through that opening into the fitment component, preferably constitutes a head which holds the join similarly to a rivet head.

In a preferred variant of the process, the operation of pressing the built-in fitment component against the inside wall of the article is effected without lost aids which for example after the article is finished have to be removed therefrom again.

In a particularly preferred variant of the process according to the invention the head of the join is produced without aids for producing a change in direction (restraining the plastic material of the wall of the hollow body, which flows into the opening).

Desirably two preforms in web form are extruded between the opened halves of a two-part blow molding mold, wherein the mold halves are firstly closed against a fitment carrier frame arranged between them, arranged within the fitment carrier frame are means for the positioning of built-in fitment components, with which the built-in fitment component is pressed out of the plane of the frame against the inside wall of the article, and wherein in a further step in the process the fitment carrier frame is removed and the mold halves are closed against each other to finish the article. With the latter step in the process welding of the two halves of the article is achieved while still in the first heat.

It is readily apparent to the man skilled in the art that, instead of a fitment carrier frame, it is also possible to provide a fitment carrier plate. In addition the fitment carrier frame does not necessarily have to be in the form of an open or opened element.

The object of the invention is further attained by a plastic hollow body having at least one built-in fitment component or attachment which was joined to the hollow body in the production thereof, wherein the hollow body and the built-in fitment component or attachment are positively lockingly joined together in such a way that the built-in fitment component or attachment has at least one through opening in the region of its contact surface with the wall of the hollow body, the plastic material of the wall of the hollow body passing through and engaging behind the through opening.

The through opening is desirably in the form of a circular round bore. Alternatively the through opening can be profiled, which is advantageous in particular when the built-in fitment component has only one through opening and a unique orientation of the fitment component in relation to the wall of the hollow body is wanted. Preferably the plastic material which passes through the through opening, in the built-in fitment component or attachment, forms an enlarged head which provides for positively locking anchorage of the two component parts.

In accordance with a preferred variant of the plastic hollow body according to the invention it is provided that the built-in fitment component has at least one foot element which forms a stepped or shouldered contact surface with the wall of the hollow body. In that way the pressure in relation to area against the wall of the hollow body is increased in the region of the contact surface, with the pressing force remaining the same. The foot element or elements produce a ram-like action which boosts the flow of the thermoplastic material of the wall of the hollow body into the through opening. Desirably the through opening passes through the contact surface of the foot element.

In a variant of the plastic hollow body it is provided that the contact surface is of a concave or conical configuration and the through opening forms approximately the deepest location of the hollow, whereby the flow movement of the plastic material of the wall of the hollow body through and behind the through opening is positively influenced.

In a further advantageous configuration of the plastic hollow body it is provided that the through opening is of an undercut configuration at its end remote from the wall of the hollow body. The undercut configuration forms the support for the enlarged head of the projection formed by molten material when it has cooled down.

If the plastic hollow body according to the invention is for example in the form of a fuel tank, then built-in fitment components of the fuel tank can be provided with a plurality of foot elements in the above-described manner. Thus, increasing the number and distribution of the join locations makes it possible to achieve a join or anchorage, which is secure for any operating condition of the vehicle, for the fitment components in the interior of the fuel tank.

DESCRIPTION OF THE DRAWINGS

The invention is described hereinafter by means of an embodiment by way of example illustrated in the drawings in which:

FIGS. 1 and 2 are diagrammatic views of the join of a built-in fitment component to the wall of the hollow body, and FIGS. 3 through 12 are diagrammatic views of the production process for a fuel tank of plastic material according to the invention.

DETAILED DESCRIPTION

Figure 5:
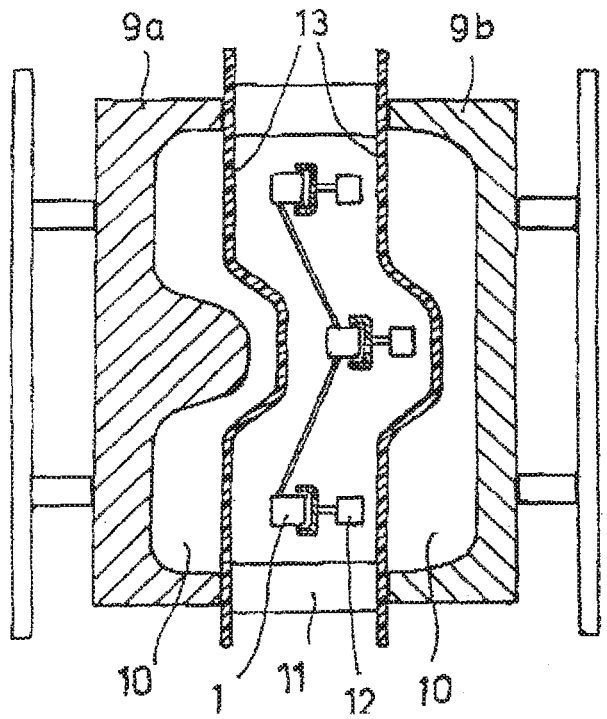

As shown in greatly simplified form in FIGS. 1 and 2 the built-in fitment component 1 which is shown in section has a foot element 2 with a through opening 3.

As already mentioned hereinbefore the process according to the invention is described hereinafter by way of example with reference to the production of a fuel tank of plastic material. The invention however is to be so interpreted that any hollow body can be produced. The join can be implemented both within and also outside the hollow body. In the present case the built-in fitment component 1 is in the form of a surge pot in a fuel tank.

The built-in fitment component 1 shown in FIG. 1 is pressed with its foot element 2 against the wall 4 of the hollow body to be produced, more specifically when the plastic material of the wall 4 is still or again in the plastic state. In the production process described hereinafter, the join is made in the first heat in production of the hollow body so that the material of the wall 4 is still in the molten state and, when sufficient pressure is applied to the foot element 2 in the direction of the arrow shown at the right in FIG. 1, the material of the wall forms the head 5 shown in FIG. 2, which engages behind the through opening 3 in the fitment component 1. The through opening 3 is preferably in the form of a circular round bore which is beveled or undercut at its end remote from the wall 4.

For the purposes of improving the flow characteristics of the material which is in the plastic state the foot element 2 has a concave contact surface 6 through which the through opening 3 passes centrally, that is to say at the deepest location of its hollow curvature. That configuration of the contact surface 6 and the foot element 2 which is stepped in relation to the fitment component 1 advantageously affects the flow characteristics of the molten material through the through opening 3. The ram-shaped, stepped configuration of the foot element 2 increases the pressure in relation to surface area in the region of the contact surface, with a given pressing force. The concave configuration of the contact surface in conjunction with the increased pressure in relation to surface area which occurs there provides that the molten material is guided into the through opening 3.

On its side remote from the contact surface 6 the through opening 3 is provided with an undercut configuration 7 which serves as a support for the head 5. (See FIG. 2.) The latter is formed even if the undercut configuration 7 is not present, then it is necessary under some circumstances for the thickness of the foot element 2 to be selected as less.

As already mentioned hereinbefore the process according to the invention is illustrated diagrammatically in FIGS. 3 through 12.

The process according to the invention includes the production of the article 8 in the form of a fuel tank by extrusion blow molding.

The mold tool comprises two mold halves 9a, 9b which are of a mutually complementary configuration and which in the closed condition define a mold cavity 10 which determines the external configuration of the article 8 to be finished. Placed between the mold halves 9a, 9b is a fitment carrier frame 11 which is arranged displaceably between the mold halves 9a, 9b. Fitment component holders 12 are arranged variably in position within the fitment carrier frame 11. The holders 12 are displaceable or movable within the fitment carrier frame 11 hydraulically or pneumatically in the plane of the fitment carrier frame and transversely relative thereto. As shown in FIG. 4 the holders 12 are equipped with fitment components 1. In the present case the fitment components 1 are connected together by way of a conduit (no identified in greater detail). Each of the fitment components is approximately of the configuration shown in FIGS. 1 and 2.

After the fitment carrier frame 11 has been positioned between the mold halves 9a, 9b, preforms 13 in web form are extruded from one or more extrusion heads (not shown), between the opened mold halves 9a, 9b. It is equally possible for the preforms 13 not to be extruded at the place at which the tool is disposed but remote therefrom and to be moved to a position between the opened mold halves 9a, 9b with a handling apparatus.

Figure 6:
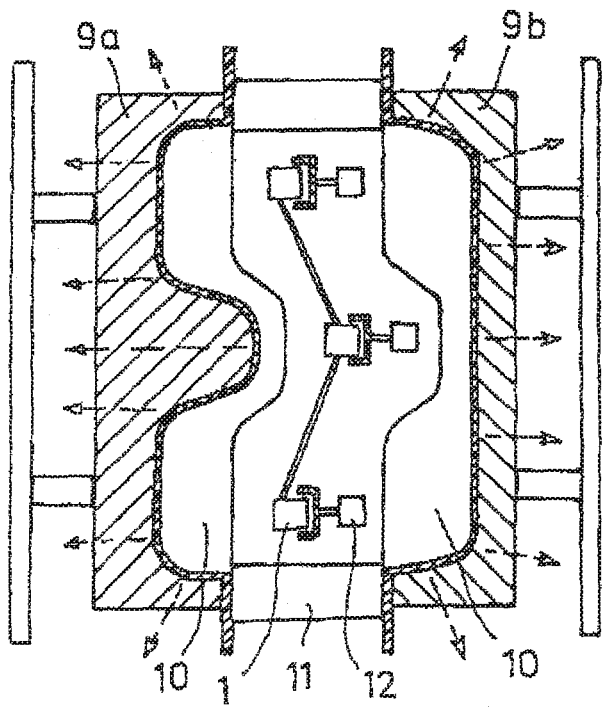
Figure 7:
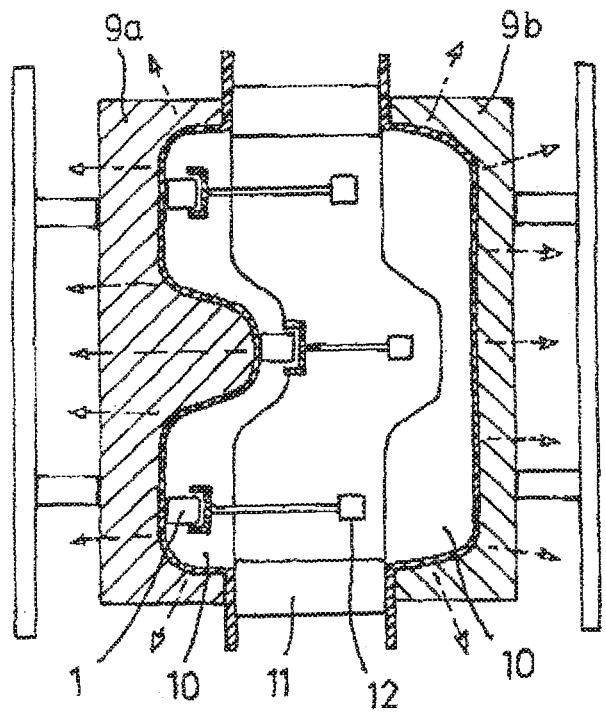
Figure 8:
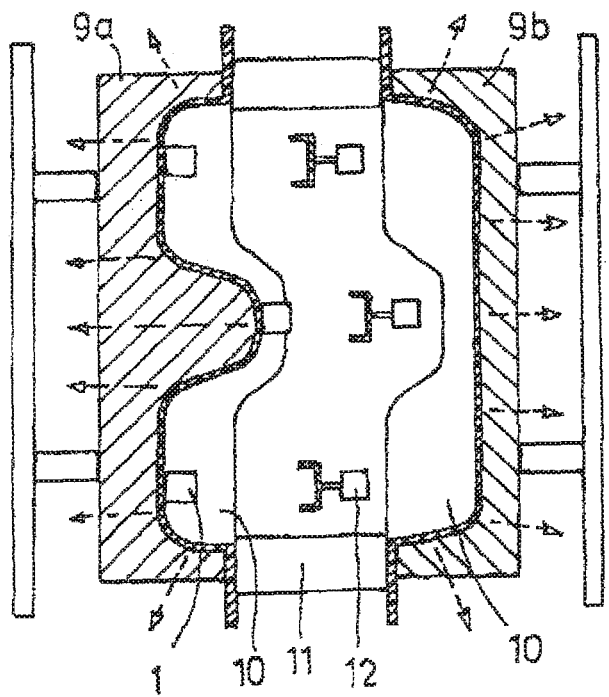
Figure 9:
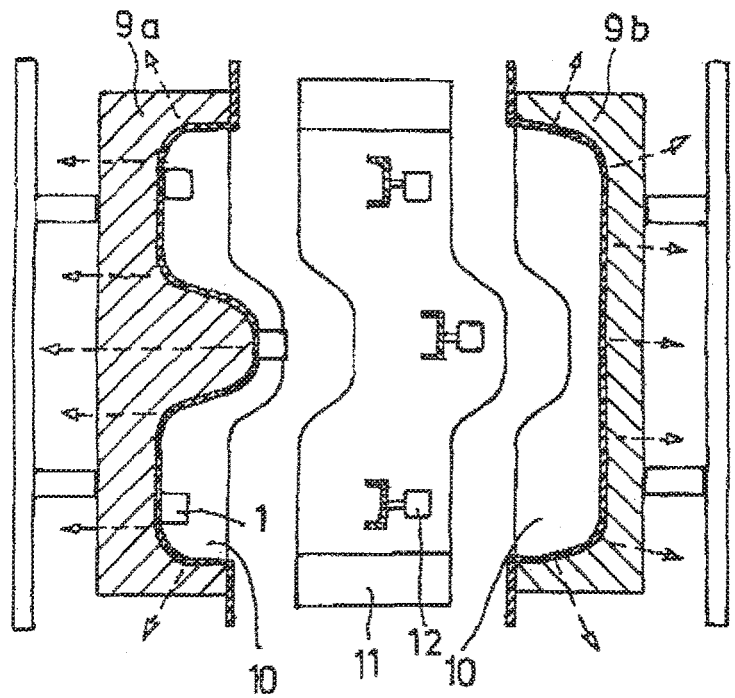
Figure 10:
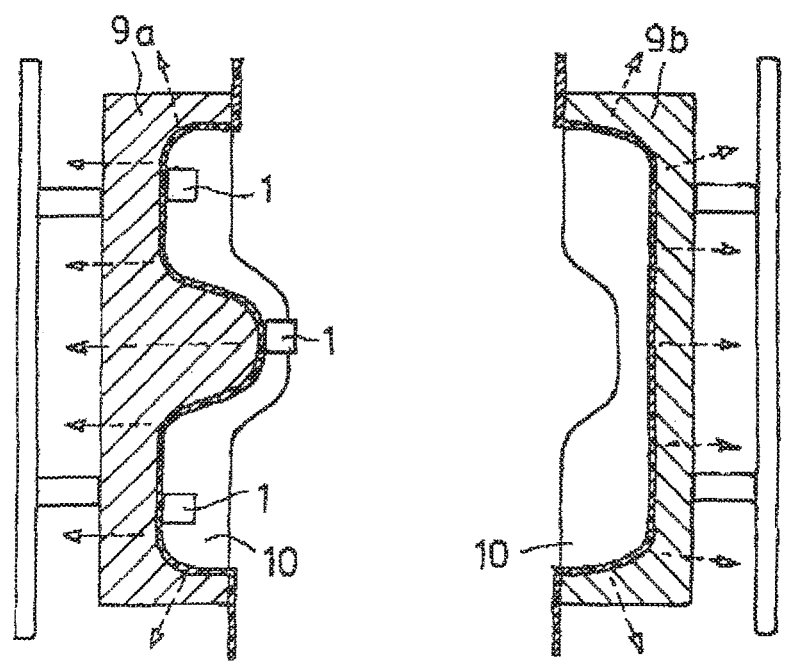

The preforms 13 extend in the position shown in FIGS. 5 and 6 between a respective mold half 9a, 9b and the fitment carrier frame 11. In a further step in the process the preforms are applied against the contour of the mold halves 9a, 9b in the mold cavity 11 by means of a reduced pressure. That can be effected with closure of the mold halves 9a, 9b against the fitment carrier frame 11 or can already have been effected previously.

The preforms 13 are caused to bear completely against the contour of the mold cavity 10 by means of reduced pressure or also increased pressure.

The component holders 12 then move out of the plane of the frame and press the fitment components 1 against the wall 4 of the article 8 or against the preforms which are bearing against the mold cavity 10. (See FIG. 7.) The above-described anchorage of the fitment components 1 to the wall 4 of the article 8 takes place accordingly.

The fitment component holders 12 then move back into their starting position. (See FIG. 8.) The mold halves are moved away from each other, with the previously formed half-shell portions of the article 8 remaining in the mold cavity. (See FIG. 9.) The fitment carrier frame 11 is moved away between the mold halves 9a, 9b, (See FIG. 10.) the tool closes again and welds the two half-shell portions of the article together.

The operations of shaping and removing the finished article 8 are diagrammatically shown in FIGS. 11 and 12.

LIST OF REFERENCES 1 built-in fitment component
2 foot element
3 through opening
4 wall
5 head
6 contact surface
7 undercut
8 article
9a, 9b mold halves
10 mold cavity
11 fitment carrier frame
12 fitment component holder
13 preforms

The invention claimed is:

1. A plastic hollow body comprising:
the hollow body in a form of a fluid container configured to contain a fluid;
at least one built-in fitment component or attachment disposed within an interior of the hollow body and joined to a wall of the hollow body, wherein the wall has an inner side facing the interior of the hollow body and an outer side facing opposite the inner side;
wherein the hollow body and the built-in fitment component or attachment are positively lockingly joined together;
wherein the built-in fitment component or attachment includes a foot element having a stepped configuration towards the wall of the hollow body which forms a stepped contact surface which contacts the wall of the hollow body;
wherein the foot element includes at least one through opening having a longitudinal length extending through the foot element along a longitudinal axis and a through opening dimension transverse to the longitudinal axis; and
wherein plastic material of the wall of the hollow body occupies the at least one through opening and forms a head having a head dimension transverse to the longitudinal axis which is larger than the through opening dimension of the at least one through opening which engages with the foot element such that the built-in fitment component or attachment is positively lockingly joined to the wall of the hollow body, wherein the plastic material of the wall of the hollow body which occupies the at least one through opening and forms the head excludes the outer side of the wall.

2. The plastic hollow body of claim 1 wherein:
the stepped contact surface is concave.

3. The plastic hollow body of claim 1 wherein:
the stepped contact surface is conical.

4. The plastic hollow body of claim 1 wherein:
facing the wall of the hollow body, the stepped configuration includes a concave region at a proximate end of the through opening.

5. The plastic hollow body of claim 4 wherein:
the concave region at the proximate end of the through opening forms part of the stepped contact surface.

6. The plastic hollow body of claim 4 wherein:
the through opening comprises a round bore; and
the concave region at the proximate end of the through opening surrounds the round bore such that the round board is located at a deepest point in the concave region.

7. The plastic hollow body of claim 4 wherein:
the concave region at the proximate end of the through opening is conical.

8. The plastic hollow body of claim 1 wherein:
the foot element has a concave surface within the stepped configuration.

9. The plastic hollow body of claim 8 wherein:
when the built-in fitment component or attachment is being joined to the wall of the hollow body, the concave surface is arranged to guide plastic material of the wall through the through opening in the foot element.

10. The plastic hollow body of claim 1 wherein:
facing away from the wall of the hollow body, the foot element has an undercut region at a remote end of the through opening.

11. The plastic hollow body of claim 10 wherein:
the head of the plastic material of the wall of the hollow body which occupies the at least one through opening occupies the undercut region.

12. The plastic hollow body of claim 11 wherein:
the head of the plastic material of the wall of the hollow body which occupies the undercut region and is shaped such that the built-in fitment component or attachment is positively lockingly joined to the wall of the hollow body.

13. The plastic hollow body of claim 1 wherein:
the head dimension transverse to the longitudinal axis which is larger than the through opening dimension of the at least one through opening is located adjacent a remote end of the through opening.

14. The plastic hollow body of claim 10 wherein:
the undercut region at the remote end of the through opening is concave.

15. The plastic hollow body of claim 10 wherein:
the undercut region at the remote end of the through opening is conical.

16. The plastic hollow body of claim 1 wherein:
the at least one built-in fitment component or attachment further comprises the at least one built-in fitment component.

17. The plastic hollow body of claim 1 wherein:
the through opening dimension transverse to the longitudinal axis is a through opening diameter, and
the head dimension transverse to the longitudinal axis is a head diameter.

18. The plastic hollow body of claim 1 wherein:
the fluid container comprises a fuel tank.

19. A plastic hollow body comprising:
the hollow body in a form of a fluid container configured to contain a fluid;
at least one built-in fitment component or attachment disposed within an interior of the hollow body and joined to a wall of the hollow body, wherein the wall has an inner side facing the interior of the hollow body and an outer side facing opposite the inner side;
wherein the hollow body and the built-in fitment component or attachment are positively lockingly joined together;
wherein the built-in fitment component or attachment includes a foot element having a stepped configuration towards the wall of the hollow body which forms a stepped contact surface which contacts the wall of the hollow body;
wherein the foot element includes at least one through opening having a longitudinal length extending through the foot element along a longitudinal axis and a through opening dimension transverse to the longitudinal axis; and
wherein plastic material of the wall of the hollow body occupies the at least one through opening and forms a head having a head dimension transverse to the longitudinal axis which is larger than the through opening dimension of the at least one through opening which engages with the foot element such that the built-in fitment component or attachment is positively lockingly joined to the wall of the hollow body, wherein the plastic material of the wall of the hollow body which occupies the at least one through opening and forms the head has a solid cross-sectional thickness whereby the head is not hollow.

20. The plastic hollow body of claim 19 wherein:
the stepped contact surface is concave.

21. The plastic hollow body of claim 19 wherein:
the stepped contact surface is conical.

22. The plastic hollow body of claim 19 wherein:
facing the wall of the hollow body, the stepped configuration includes a concave region at a proximate end of the through opening.

23. The plastic hollow body of claim 22 wherein:
the concave region at the proximate end of the through opening forms part of the stepped contact surface.

24. The plastic hollow body of claim 22 wherein:
the through opening comprises a round bore; and
the concave region at the proximate end of the through opening surrounds the round bore such that the round board is located at a deepest point in the concave region.

25. The plastic hollow body of claim 22 wherein:
the concave region at the proximate end of the through opening is conical.

26. The plastic hollow body of claim 19 wherein:
the foot element has a concave surface within the stepped configuration.

27. The plastic hollow body of claim 26 wherein:
when the built-in fitment component or attachment is being joined to the wall of the hollow body, the concave surface is arranged to guide plastic material of the wall through the through opening in the foot element.

28. The plastic hollow body of claim 19 wherein:
facing away from the wall of the hollow body, the foot element has an undercut region at a remote end of the through opening.

29. The plastic hollow body of claim 28 wherein:
the head of the plastic material of the wall of the hollow body which occupies the at least one through opening occupies the undercut region.

30. The plastic hollow body of claim 29 wherein:
the head of the plastic material of the wall of the hollow body which occupies the undercut region and is shaped such that the built-in fitment component or attachment is positively lockingly joined to the wall of the hollow body.

31. The plastic hollow body of claim 19 wherein:
the head dimension transverse to the longitudinal axis which is larger than the through opening dimension of the at least one through opening is located adjacent a remote end of the through opening.

32. The plastic hollow body of claim 28 wherein:
the undercut region at the remote end of the through opening is concave.

33. The plastic hollow body of claim 28 wherein:
the undercut region at the remote end of the through opening is conical.

34. The plastic hollow body of claim 19 wherein:
the at least one built-in fitment component or attachment further comprises the at least one built-in fitment component.

35. The plastic hollow body of claim 19 wherein:
the through opening dimension transverse to the longitudinal axis is a through opening diameter, and
the head dimension transverse to the longitudinal axis is a head diameter.

36. The plastic hollow body of claim 19 wherein:
the fluid container comprises a fuel tank.

* * * * *